[11] 3,571,649

[72] Inventor David N. Bush, Jr.
1137 23rd st., Santa Monica, Calif. 90304
[21] Appl. No. 792,286
[22] Filed Jan. 21, 1969
[45] Patented Mar. 23, 1971

[54] OPTICAL FILTRATION FOR UNDERWATER VIEWING, PHOTOGRAPHY, AND THE LIKE
2 Claims, 2 Drawing Figs.
[52] U.S. Cl. .................................................. 313/112,
95/11, 350/311
[51] Int. Cl. ..................................................... H01j 5/16,
H01j 61/40, H01k 1/26
[50] Field of Search........................................ 313/112;
351/43; 350/311; 95/11 (UW)

[56] References Cited
UNITED STATES PATENTS
2,996,966 8/1961 Edgerton...................... 95/11(U.W.)
3,242,701 3/1966 Shaffer.......................... 313/112X
OTHER REFERENCES
Gregg, J.R., " Visual Problems of Skin Diving," Optometric Weekly, July 13, 1961, volume No. 52, No. 28, pp 1881— 85, 1388. Copy in 351/43. Reb. Koff, D.i "Underwater Color Cinematography," JOURNAL OF THE SMPTE, Aug. 1954, Vol. 63, pp. 55— 60. Copy in 95/11(VW)

*Primary Examiner*—David Schonberg
*Assistant Examiner*—Toby H. Kusmer
*Attorney*—Jessup and Beecher ABSTRACT: The present invention provides selective color filtration devices for underwater viewing or photography, including the provision of a predetermined color-selective light-filtering coating on a light source used for underwater viewing or photography designed, for example, to absorb light in the blue-green end of the visible spectrum and to pass the red, orange and yellow wavelengths, in accordance with a predetermined formula, so as to correct to some extent the filtering effect caused by the water and by the particles suspended in the water.

When the teachings of the present invention are followed, underwater objects may be photographed in colors more natural than those heretofore possible, and without the usual bluish-greenish tinge which such objects are normally photographed by present day equipment.

OPTICAL FILTRATION FOR UNDERWATER VIEWING, PHOTOGRAPHY, AND THE LIKE

BACKGROUND OF THE INVENTION

A selective color filter may be considered to be a device or material for suppressing or minimizing waves of certain frequencies passing through it without greatly altering the intensity of others. The concepts of the present invention are predicated on the fact that light traveling through water is affected differently from light traveling through air. That is, the red, orange and yellow wavelengths of the light passing through water are more rapidly absorbed by the water than are the blue-green wavelengths of the visible spectrum, due to the color selective filtering characteristics of the water and of the particles suspended in the water.

As described in an article in the Journal of the Optical Society of America, Volume 57, No. 6, for Jun., 1967, by Jo Ann S. Kinney et al., entitled "Visibility of Colors Underwater," the problem of determining which colors will be most and least visible underwater is much more complicated than it is in air. This is because the transmission of light through air does not change its spectral composition to any appreciable extent. However, the transmission of light through water can alter its spectral composition beyond recognition.

As also pointed out in the article, water selectively absorbs light at different wavelengths. Pure water, for example, has its greatest transmittance at 480 m$\mu$ in the blue-green region of the visible spectrum. However, the peak of the transmittance curve shifts towards the red end of the visible spectrum in the presence of the usual natural contaminants suspended or dissolved in the water.

Although the spectral transmittance characteristics vary from one body of water to another, depending, for example, to the presence of plankton, salt, pollution, and other contaminants which not only lower the total transmittance, but selectively absorb more of the shorter wavelengths than of the longer wavelengths, a general formula can be worked out to provide filtration for underwater viewing and photography in colors which approach the natural, and in a wide variety of bodies of water.

It should be pointed out that the difference among the spectral transmittance curves for various bodies of water become more exaggerated as the viewing distances are increased. However, since viewing distances are necessarily limited, the practice of the present invention is contemplated to be applicable, for example, to viewing distances of approximately 1 foot to 30 feet in real distance.

In any event, the following factors must be considered in the fabrication of an appropriate color-selective filtration coating: the spectral distribution of the visible light reaching the camera or the eye of the observer after transmission through a given distance of the water; the spectral reflectance of the object being observed in the direction of the observer or camera; the spectral distribution of the visible light reaching the object from the light source; and the spectral distribution of the visible light reaching the observer or camera from the water background of the object.

It will be appreciated from the foregoing that objects viewed or photographed underwater normally appear to have a greenish-bluish tinge. For example, under normal conditions when a light beam is traveled about 10 feet through water, it has lost most of its red, orange and yellow components. Another characteristic of underwater lighting, as mentioned above, is that all the wavelengths of the light are attenuated more or less completely at relatively small distances from the source. This occurs, no matter how intense the light source may be. Therefore, objects may be illuminated by an underwater light source only if they are relatively close to the source.

In the practice of the present invention, in one of its aspects, flashbulbs, lights, reflectors, and other objects to which light passes for illuminating or viewing objects underwater, are coated in selected densities, as will be described specifically herein, with color-selective light-filtration coatings for filtering the blue-green end of the spectrum, as mentioned above, to reduce the intensity of the visible spectrum, so as to achieve an approximate color balance with the red, orange and yellow wavelengths. Therefore, any lighting equipment used, for example, in conjunction with underwater viewing or photography, such as flashbulbs, or other light sources, or reflectors, and which include a transparent or translucent member through which the light passes, will have that member coated with a selected dye in accordance with the concepts of the present invention which, as mentioned above, absorbs the light rays in the blue-green end of the visible spectrum, so as to achieve an approximate color balance for all light reaching the eye of the observer or lens of the camera.

It will be appreciated that the teaching of the present invention may be applied not only to underwater color photography, but also to underwater black and white photography since the approximate color balance achieved by the filtration of the present invention provides for clearer, distincter and truer black and white photographs, as well as more natural color photographs. It will also be appreciated that the teaching of the present invention as applied to underwater color or black and white photography, or the like, is the converse to the practices normally followed in above water photography.

Most lighting equipment presently used in above-water photography is of the filament incandescent type. The light emitted from such equipment is rich in reds, oranges and yellows extending into the 2,500°—4,000° K. range. Such light, which does have the tendency to be suitable for underwater photography, is not suitable for the normal above-water photography, and, for that reason, photoflash lamps coated with a blue dye are often used in the practice of the prior art concepts. The use of such photoflash lamps serves to attenuate the colors in the red end of the spectrum, so that they may be equalized with the blue for more natural above-water photography as practiced in the prior art.

However, in underwater photography, and as explained above, it is necessary to emphasize the red end of the spectrum due to the selective filtering characteristics of the water, so as to achieve reproduction in more natural color. This may be achieved, for example, by the use of appropriate filters over the camera lens. However, the use of such filters represents an expensive approach to the problem, and requires relatively elaborate equipment. Moreover, the use of such color selective filters over the camera lens tends to introduce lens distortion problems into the photographic process.

A second approach for providing a compensating color corrective factor in underwater photography may be achieved, as explained above, by using a light source which will produce light in which the red end of the visible spectrum is emphasized with respect to the blue end. Some correction may be achieved, for example, by using the aforesaid incandescent type of white light, as suggested above, which is rich in red, orange and yellow components. However, more satisfactory results are achieved by practicing the principles of the present invention, whereby an appropriate color selective filtration means is provided so that the imbalances in the light reflected by the object being observed as it travels through the water, may be compensated.

Therefore, as described above, the concepts of the present invention can be applied to artificial lighting equipment, such as photoflash lamps, and other light sources and reflectors, which are used in underwater color and black and white photography, so as to compensate for the color imbalances created in the light used to illuminate the underwater objects due to the selective light absorbing characteristics of the water.

DETAILED DESCRIPTION OF THE ILLUSTRATED EMBODIMENTS

Figure 1:
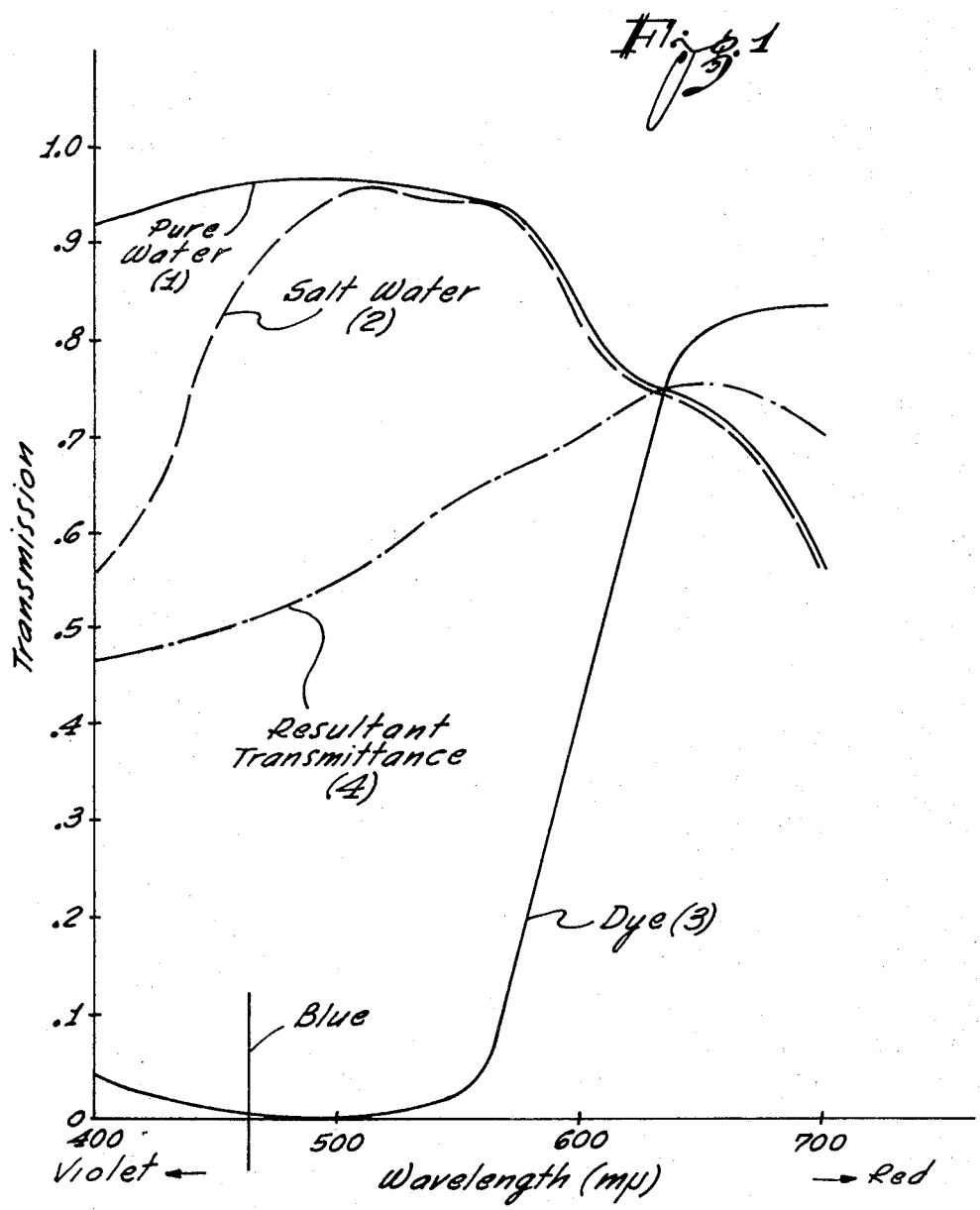
FIG. 1 is a representation of various spectral transmission curves and which is useful in explaining the concepts of the invention.

As shown by the curves of FIG. 1, relatively pure fresh water (curve 1) and salt water (curve 2) both exhibit spectral transmittance curves which follow essentially the same paths for wavelengths above 500 m$\mu$, and which peak at the blue-green portion of the visible spectrum around 550 m. The particular graph shown in FIG. 1 indicates the effect of water on light when it has traveled, for example, 1 meter through a specified body of water.

It should be noted that the curves of FIG. 1 are representative of the effect of light traveling from a first point to a second point through water, the light being read at the second point by a spectrophotometer. When the graph is considered from a photographic or viewing aspect, the distance would have to be reduced by one-half, since the light is selectively filtered by the water as it travels from its point of origin to the object being viewed or photographed, and again selectively filtered as it is reflected back from the object to the observer.

It is evident, therefore, from a consideration of the curves of FIG. 1, that at the closer distances there will be an overcompensation of the red and at the longer distances the filtering effect of the water will create an imbalance again in the blue region. However, in both instances, the overall effects are far more desirable than the results achieved when no correction is used. By varying the density of the selective color filtration coating utilized in any particular environment, the optimum color balance may be achieved for any specific desired distance.

Therefore, if a light selective filtration dye is used having characteristics such as shown in curve 3, an approximate color balance is achieved for both salt and fresh water for a distance, for example, of one-half meter, as shown by the resultant transmittance curve (4) of FIG. 1.

An appropriate dye which is available on the market and which has light filtration characteristics such as shown by the curve (3) of FIG. 1, is known commercially as "SA-50 -4-RUBY RED." Such a dye may be used, for example, to coat the flashbulbs, or other light sources used for underwater photography, in accordance with the concepts of the present invention, in order that the objects may be photographed or viewed underwater in colors more approaching their natural colors, as seen above water.

It is to be understood, of course, that the concepts of the invention are not limited to any particular dye, since any dye having color filtration characteristics approximating those shown by the curve (3) of FIG. 1, or by equivalent curves at various distances at which the object is to be viewed or photographed, may be used.

Figure 2:
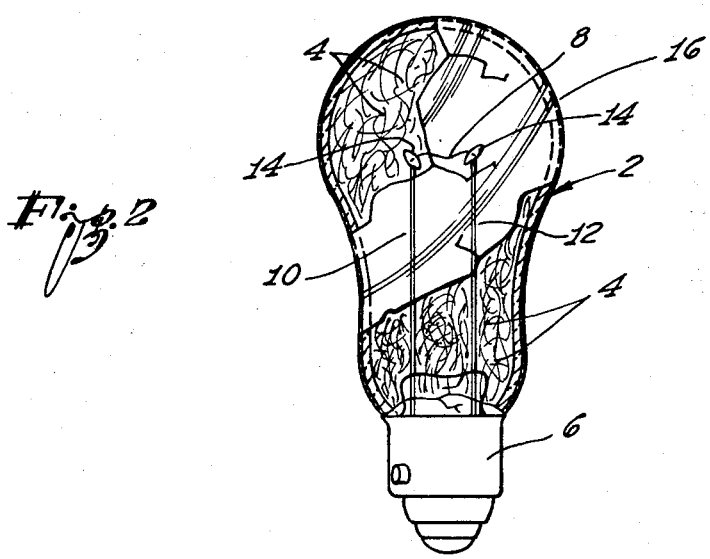
FIG. 2 is a representation, partly in section, of a photoflash lamp coated with a selective color filtration coating in accordance with the concepts of the present invention to make it suitable for underwater color or black and white photography.

The appropriate dye, for example, is applied to the aforesaid transparent or translucent member of the light source as a coating, preferably of the order of 4-mils thick when dry. In the specific embodiment of FIG. 2, the coating is used in conjunction with a photoflash lamp designated generally as 2. In accordance with usual practice, the photoflash lamp may be filled with a selected gas, and also with a quantity of aluminum foil designated 4. The photoflash lamp 2 is provided with a base 6 which is affixed to the neck of the lamp. A filament 8 is bridged across a pair of wires 10 and 12, the wires extending through the base 10 to suitable terminals at the end of the base. The outer wall of the photoflash lamp 12 is provided with a color-selective coating in accordance with the explanation contained in the preceding paragraph.

For optimum color balance, for example, in accordance with the concepts of the present invention, it is important that the color quality (K.°) be known as well as the general type of water so that appropriate color balance may be achieved by the selection of the proper color filtration dye for photography or viewing. Since most photographs are presently being made with photoflash bulbs of a known Kelvin temperature, this may be used as a guide. In this way, the concept of the present invention can be used in conjunction with any known type of presently available flashbulb, for example, with any major changes being required.

It will be appreciated, and as mentioned above, that the selective color filtration dye may be used in combination with any transparent or translucent member through which light passes, for underwater illumination. When so used, objects viewed or photographed underwater appear in colors more nearly approaching their natural above water colors, and they do not have the bluish-greenish tinge, either when viewed or when reproduced by photography, as is prevalent when prior art equipment is used.

I claim:

1. In combination for underwater use, a light source and a predetermined color-selective light-filtering coating thereon to absorb light in the blue-green end of the visible spectrum and to pass the red, orange and yellow wavelengths in accordance with a predetermined formula, so as to achieve a substantial color balance and to compensate for the selective filtering effect caused by water and by particles suspended therein; said formula providing that said light-filtering coating exhibit high light-absorbing properties in the portion of the visible spectrum extending substantially from 450—600 m$\mu$ in wavelength, and providing that said light-filtering coating passes light with minimum attenuation in the red portion of the visible spectrum.

2. The combination defined in claim 1, in which said light source comprises a photoflash lamp.